United States Patent Office 2,772,315
Patented Nov. 27, 1956

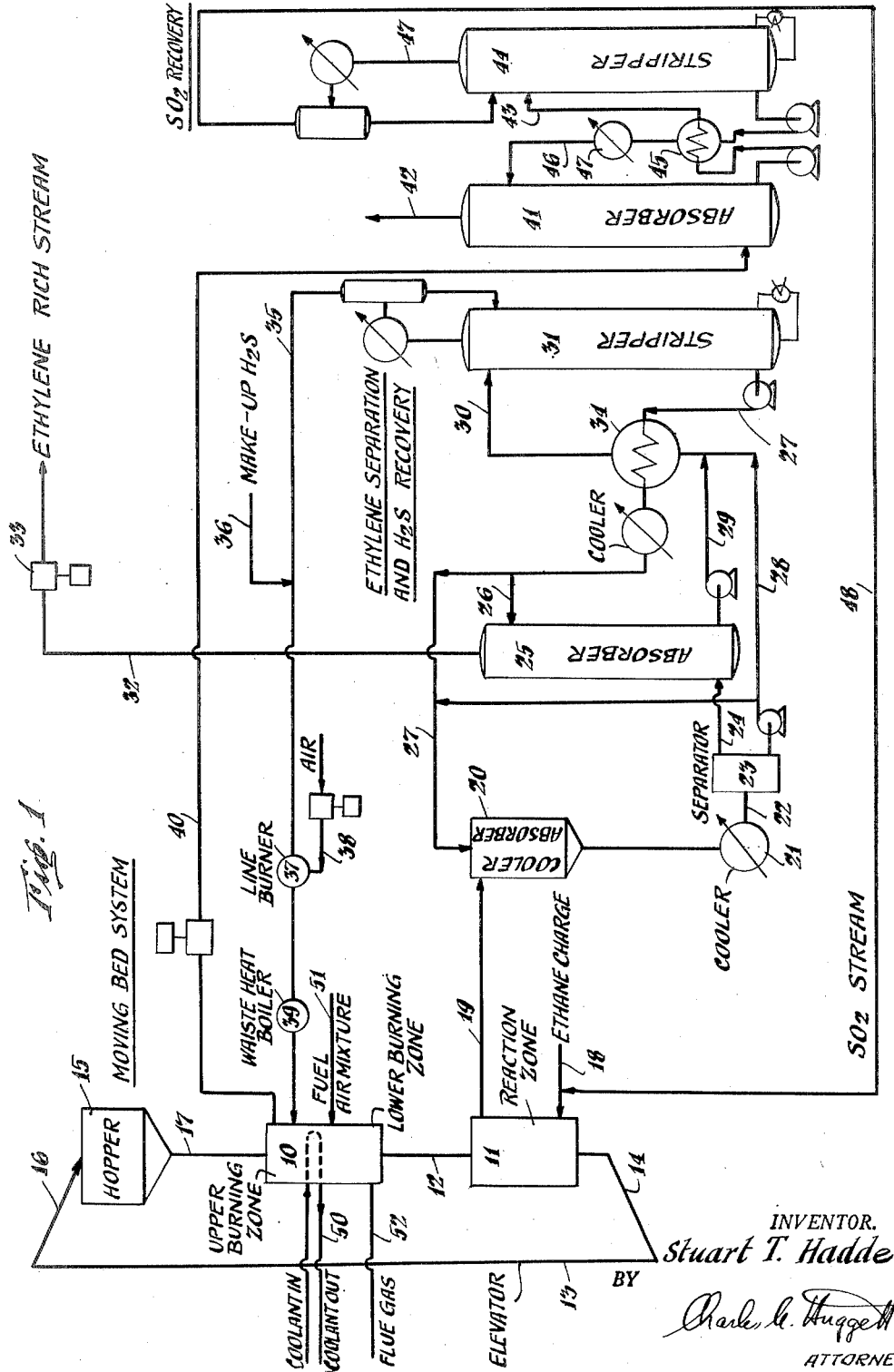

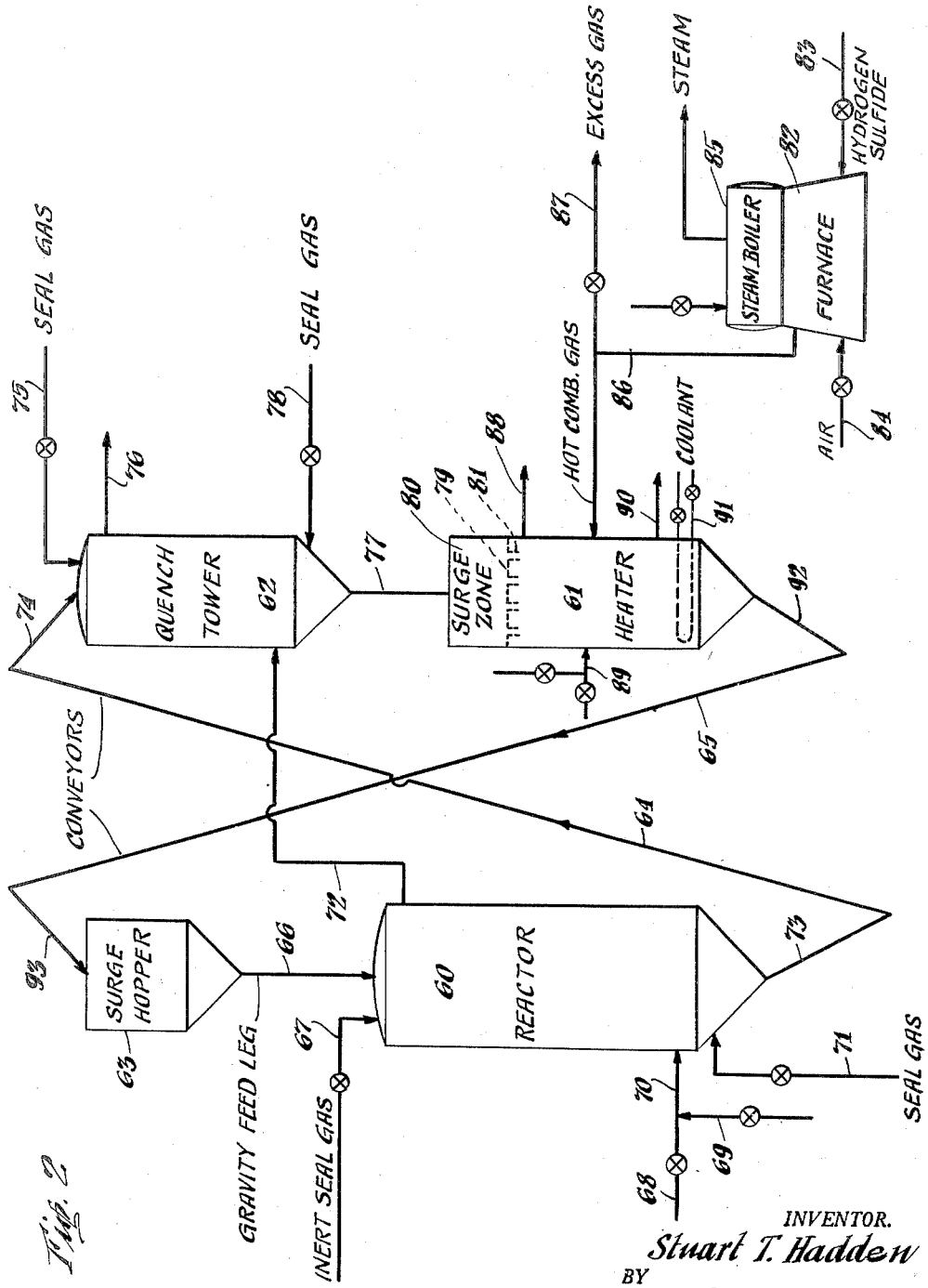

2,772,315

DEHYDROGENATION PROCESS

Stuart T. Hadden, Woodbury, N. J., assignor to Socony Mobil Oil Company, Inc., a corporation of New York Application June 19, 1952, Serial No. 294,303

6 Claims. (Cl. 260—683.3)

This invention pertains to the dehydrogenation of saturated hydrocarbons to produce unsaturated materials. It is particularly directed to an improved process for the dehydrogenation of ethane to ethylene.

Many chemical processes require unsaturated hydrocarbons, such as ethylene, propylene, butylene, etc., as a starting material. These materials are scarce and difficult to obtain in the pure state. The practice has developed, therefore, of forming these unsaturates by a chemical dehydrogenation of the more plentiful saturated materials, ethane, propane and butane, etc.

It is old in the art to pass saturated hydrocarbons through a bed of solid catalytic material maintained at suitable dehydrogenating conditions to produce the unsaturated material. For example, butane may be converted to butylene by passing it through a bed of either an oxide of a metal of Group VI of the periodic system or that oxide supported on a carrier such as alumina or silica. The prior art also shows that the amount of unsaturated material may be increased by adding an oxide of sulfur or nitrogen, such as $SO_2$, $SO_3$, $NO_2$ or NO to the reaction mixture. This may be caused by the fact that these materials react with the hydrogen produced by the dehydrogenation reaction thereby causing a shift in the equilibrium of the reaction. For example, in the dehydrogenation of isobutane the reaction proceeds until there is, for a given temperature, say 10 percent isobutylene and hydrogen present and 90 percent isobutane. If $SO_2$ is introduced with the isobutane the $SO_2$ reacts with the hydrogen, presumably according to the following reaction:

$$SO_2 + 3H_2 \rightarrow H_2S + 2H_2O$$

Since the hydrogen has been removed, the equilibrium is shifted, and more of the isobutane is converted to produce more isobutylene and hydrogen.

The prior processes utilized fixed beds of contact material which periodically required reheating and reconditioning. The hydrogen sulfide was continuously removed from the process. It is the purpose of this invention to provide an improved process for the production of unsaturates in the presence of sulfur dioxide in which the hydrogen sulfide thereformed is continuously utilized in the process.

The object of this invention is to provide an improved process for the dehydrogenation of saturated hydrocarbons in the presence of sulfur dioxide which overcomes the deficiencies of the prior art.

A further object of the invention is to provide a more efficient method of producing unsaturated hydrocarbons from saturated hydrocarbons.

A further object of this invention is to provide an improved method of continuously producing ethylene from ethane in the presence of sulfur dioxide which utilizes in the process the chemical energy of the hydrogen sulfide produced during the dehydrogenation reaction and requires a minimum amount of sulfur dioxide in the ethane feed stream.

These and other objects of the invention will be made apparent in the following detailed description of the invention made in conjunction with the attached sketches.

Figure 1 is a diagrammatic showing of apparatus for the continuous production of ethylene from ethane.

Figure 2 is a vertical elevation of an alternate apparatus arrangement in which the invention can be practiced.

The invention in one of its broadest forms comprises a cyclic system in which the saturated hydrocarbons and sulfur-dioxides are passed through a particulate mass of a suitable heat carrying material, catalytic or otherwise, at reaction temperatures suitable for producing the desired unsaturated material and hydrogen sulfide as a by-product and in which at least a substantial amount of the heat of reaction is supplied from the combustion of the hydrogen sulfide. In one aspect of the invention at least a substantial amount of the sulfur dioxide used in the reaction is provided by separating the sulfur dioxide from the water formed by the combustion of the hydrogen sulfide product. The invention may be applied to cyclic systems of the fixed bed type where several reaction zones are used in sequence for periods of time alternately on reaction and then on regeneration cycles. The invention may also be applied in more preferred form to moving bed processes in which a contact material is gravitated continuously through reaction and regeneration zones as a substantially compact mass of solids in an enclosed cyclic path or similarly to a continuous process in which the solids are passed through the reaction and reconditioning zones in the form of a gaseous suspension.

Referring now to Figure 1, a moving bed system is shown in which a kiln 10 is located above a reactor 11 and the vessels are connected by conduit 12. The reactor 11 is connected to the bottom of an elevator 13 by the conduit 14. The top of the elevator is connected to the top of a hopper 15 by the conduit 16. The bottom of the hopper 15 is connected to the top of the kiln by the conduit 17.

In operation, a hot inert granular solid is gravitated through the conduit 12 and vessel 11 as a substantially compact column. A mixture of ethane and sulfur dioxide is introduced into the vessel 11 through the conduit 18. The ethane and sulfur dioxide contact the mass of hot contact material in the vessel and react producing ethylene and hydrogen sulfide. The products are taken from the upper portion of the vessel 11 through the conduit 19 to the top of a cooler-absorber 20. The cooling of the product should be rapid enough to prevent undesirable side reactions from occurring which would result in the formation of mercaptans, polymers, etc. The products, partially cooled, are withdrawn from the bottom of the absorber 20 and cooled further in the cooler 21. They are then passed via the conduit 22 into the separator 23. The vapors are taken overhead via the conduit 24 to the bottom of an absorber 25. The gas removed from the top of the absorber via conduit 32 is pumped to storage by means of pump 33 as the ethylene rich stream. Liquid product is removed from the bottom of separator 23 and absorber 25 via conduits 28 and 29 and combined into a single stream in the conduit 30. The product is introduced into the top of the stripper 31. A recycle stream of liquid is removed from the bottom of the stripper 31, passed through heat exchanger 34, in heat transfer relation with the liquid in conduit 30, and introduced into the top of the absorber 20 and 25. The hydrogen sulfide gas is taken overhead via the conduit 35. Make-up $H_2S$ is added to the conduit 35 via the conduit 36. Air is introduced into the stream of $H_2S$ in the line burner 37 through the conduit 38. The $H_2S$ is therefore burned in burner 37 and the products are passed through the waste heat boiler 39.

The hot gas is introduced into the vessel 10 to pass upwardly through the contact material in the upper burning zone. The combustion products are removed from the top of the vessel 10 via the conduit 40 and introduced into the lower portion of the absorber 41. Waste gas is taken overhead from the absorber 41 via the conduit 42. The liquid is transferred from the bottom of the absorber via conduit 43 and introduced into the top of the stripper 44. Recycle material is taken from the bottom of the stripper 44, passed through the heat exchanger 45, in heat transfer with the material passing through the conduit 43, and passed via conduit 46 into the top of the absorber 41. A cooler 47 may be used to extract heat from the recycle stream. The sulfur dioxide is taken overhead from the stripper via the conduit 47 and returned to the supply conduit 18 for the reactor 11 via the conduit 48.

The cooled contact material is gravitated through the conduit 14 and raised by means of the elevator 13 to a level above the kiln 10. The particles are discharged from the top of the elevator 13 through the conduit 16 into the hopper 15. The particles are gravitated as a substantially compact column from the bottom of the hopper 15 through the conduit 17 into the top of the kiln 10. The particles are heated in the upper portion of the kiln by contact with the hot gases formed by the combustion of the H₂S. The particles may be cooled at an intermediate level in said vessel by a coolant passed through the coils 50. Fuel and air may be admitted to the lower portion of said vessel via conduit 51 to burn in contact with the particles and provide additional heat. The combustion products are withdrawn via the conduit 52. The hot particles are gravitated through the conduit 12 into the top of the reaction zone 11.

The process for dehydrogenation of ethane depends upon the following reaction:

$$3C_2H_6 + SO_2 \rightleftharpoons 3C_2H_4 + H_2S + 2H_2O$$

This reaction will be essentially complete at temperatures above about 1000° F. In this invention, this heat is supplied by the hot contact material and the contact material is brought up to temperature mainly by the combustion of the H₂S product formed by the dehydrogenation reaction. The SO₂ recovered from the combustion step is then used in the dehydrogenation step. Thus, except for unavoidable losses of sulfur, the process is essentially self-contained as far as heat requirements and chemicals are concerned.

In operation the ethane charge is mixed with the recovered sulfur dioxide and fed into the bottom of the reaction zone where they flow countercurrently to the heat transfer material. The hot contact material is introduced into the top of the reaction zone at the desired reaction temperature. The temperature at the top of the reaction zone depends to some extent upon the economics of operation but should be within the range of approximately 800–2000° F. and preferably about 1100–1700° F. The proportions in which the sulfur dioxide is mixed with the hydrocarbon feed will depend upon the composition of the latter to some extent. For a feed of essentially pure ethane, the optimum mixture approaches the stoichiometric proportions required in the reaction:

$$3C_2H_6 + SO_2 \rightleftharpoons 3C_2H_4 + H_2S + 2H_2O$$

as the reaction temperature is increased, thermal dehydrogenation increases, thereby requiring less sulfur dioxide. It is desirable to reduce the SO₂ concentration at high temperature to avoid reaction of sulfur dioxide with ethylene and hydrogen sulfide. However, when the feed contains more reactive hydrocarbons such as propane or propylene, sufficient sulfur dioxide must be provided for reacting with them to the extent to which they are not thermally dehydrogenated to less reactive materials.

At low reaction temperature levels of, say, 1000–1300° F., it is advantageous to use a heat transfer material that has catalytic activity. At higher temperatures than the above, it is impossible to retain catalytic activity because of the progressive loss of surface area attendant upon heating the catalyst above 1300° F.

The hydrogen sulfide recovered from the reactor effluent is burned with a minimum of excess air to supply heat in the upper burning zone. Hydrogen sulfide does not have to be burned in the bed directly, but may be burned in a burner located inside the bed. Alternatively, the burner may be located outside the bed and suitable heat transfer means used to transfer the heat from the burner to the bed. A minimum of excess air is used in the combustion of the H₂S to reduce the formation of sulfur trioxide and the subsequent oxidation of sulfites in the sulfur dioxide recovery step. For conditions where the stoichiometric quantity of air is used, the dew point of the combustion products is about 125° F. Hence, to avoid condensation of water on the heat transfer material at the top of the kiln, the heat transfer material must be withdrawn from the reaction zone at a sufficiently higher temperature so that the temperature drop in the elevator will not bring it below about 130° F.

*Example I*

The invention may be illustrated by an example using apparatus of the type shown diagrammatically on Figure 1. Using a feed composed of methane, ethane and propane a suitable charge rate would be:

| I | Mols/Day |
|---|---|
| Methane  | 500 |
| Ethane  | 5,000 |
| Propane | 500 |
| | 6,000 |

When the feed is mixed with sulfur dioxide in the ratio of about three mols feed per mol sulfur dioxide, the gas flow rate to the reactor is about 140,000 cu. ft./hr. at a temperature of 130° F. The heat transfer material is introduced into the top of the reactor at 1300° F. Under these conditions and using a particle size of 0.15 inch, the cross-section of the heat transfer bed is 50 square feet in the reaction zone and 100 square feet in the combustion zone, for an allowable pressure drop of 6 inches of water per foot. The reactor effluent volume is about 630,000 cu. ft./hr. Combustion of the H₂S of the effluent at a temperature of about 1800° F. produces about 1,030,000 cu. ft. per hour of combustion products. A contact material circulation rate of about 30 tons per hour is required to transfer the necessary heat from the heater to the reactor. Under these conditions, ethylene is produced at a rate of 4,500 to 4,800 mols per day, and may be recovered at about 80 to 90 mol percent purity.

Figure 2 shows a modified form of apparatus for practicing the invention. A reactor 60 is shown in side-by-side relationship with a heater 61 and superposed quencher 62. A surge hopper 63 is located above the reactor 60 and elevators 64, 65 are suitably located for transferring contact material from the bottom of the reactor to the top of the quencher and from the bottom of the heater to the top of the surge hopper. The vessels are connected by conduits which confine the solid contact material in the system to an enclosed cyclic path.

In operation, a hot granular contact material is gravitated as a substantially compact column downwardly from the hopper 63 through feed leg 66 into the top of the reactor 60. The reactor may be operated at advanced pressure, say, for example, 15 p. s. i. (gauge) when the hopper is operated at 0 p. s. i. (gauge). The feed leg 66 is made long enough so that the particles will feed into the vessel against the advanced pressure and provide a seal column to prevent the escape of gas from the vessel. An inert seal gas is introduced into the top of the vessel via the conduit 67 to prevent any substantial amount of the reactants from escaping up the feed leg 67. Streams of ethane and SO₂ in conduits 68, 69 are mixed in conduit 70 and introduced into the bottom of the vessel 60 at substantially atmospheric temperature. A seal gas is introduced into the bottom of the reactor 60 via the conduit 71 at a level beneath the level of introduction of the reactant charge to prevent the downward movement of reactants with the gravitating particles. The reactants pass upwardly through the bed and the products H2S and ethylene are removed from the top of the vessel via the conduit 72, and transferred to the bottom of the quencher 62. The temperature at the top of the bed in the reaction zone is about 1300° F. whereas the temperature at the bottom of the bed had been reduced to about 150° F. This cooled contact material is withdrawn from the bottom of the bed via conduit 73. The solids are lifted through the elevator 64 and gravitated from the top of the elevator into the top of the quencher 62 via the conduit 74. The quencher may be operated at about 10 p. s. i. (gauge) so that the conduit 74 is made long enough to provide a suitable seal column for the vessel. The inert gas is also introduced into the top of the vessel 62 via the conduit to aid in sealing the vessel 62. The hot reaction products pass upwardly through the mass of solids in the quencher and are cooled thereby. The cooled products are removed from the top of the quencher via the conduit 76 at a temperature of about 160° F. The solids are introduced into the top of the quencher at a temperature of about 150° F. and withdrawn from the bottom thereof at about 770° F. via the conduit 77 to the top of the heater 61. A seal gas is introduced into the bottom of the quencher 62 via the conduit 78 at a level beneath the level at which the products are introduced thereto to prevent the products from moving downwardly with the solids. The heater has a horizontal plate 79 located in the upper portion of the vessel to define a surge zone 80 above the plate. The plate 79 has drop pipes 81 for downward transfer of the solids into an upper heating zone. The ethylene and H2S removed from the quencher 62 are separated in a fractionator (not shown) and the H2S is introduced into the furnace 82 via the conduit 83. Air is introduced into the furnace 82 via the conduit 84 and the H2S is burned. Steam is generated by the heat in the steam boiler 85 for use in other apparatus, not shown. The hot gases are conducted from the furnace 82 via the conduit 86 into the upper section of the heater 61. Excess gas over that required in the heater may be withdrawn from the conduit 86 via the conduit 87. The hot gas travels upwardly through the column of solids in the heater raising the temperature of the contact material. The cooled gas is removed from a level just beneath the partition plate 79 via the conduit 88. Air and fuel may be added to the vessel 61 via the conduit 89 at a level beneath the level at which the hot combustion gases are introduced into the vessel 61 to burn in contact with the solids and effect an increase in the temperature of the solids. The flue gas is removed from the bottom of the vessel 61 via the conduit 90. A coolant may be introduced into the bottom of the vessel 61 via the coil 91 to cool the particles when desired. The particles may be introduced into the vessel 61 at a temperature of 770° F. and withdrawn from the bottom of the vessel at a temperature of about 1350° F. The hot solids are transferred from the bottom of the vessel 61 to the bottom of the elevator 65 via the conduit 92. The solids are gravitated from the top of the elevator via the conduit 93 into the surge hopper 63. The pressure in the heater may be maintained at about 2 p. s. i. (gauge).

Although the invention has been disclosed in its application to a moving bed system, in one of its broader aspects, it is applicable to cyclic systems of the fixed bed type where a mass of solids is alternately on reaction and then regeneration or heating. It can also be applied to fluid processes. The invention is applicable to thermal dehydrogenation where inerts are used or catalytic dehydrogenation where a suitable dehydrogenating catalyst is used. The process has particular application to the dehydrogenation of ethane, propane or butane, but also can be applied to the dehydrogenation of higher boiling hydrocarbons, including naphtha or gas oils.

The invention is not intended to be limited to the specific embodiments shown above, being broad in its application and intended to cover all changes and modifications of the examples of the invention herein chosen for purposes of disclosure, which do not constitute departures from the spirit and scope of the invention.

I claim:

1. The process of dehydrogenation of saturated lower hydrocarbons with sulfur dioxide which comprises: contacting a hot contact material at a pressure not less than atmospheric with a mixture of sulfur dioxide and saturated lower hydrocarbons for a period of time sufficient to effect dehydrogenation of the hydrocarbons, whereby the contact material is cooled by the reaction, withdrawing the products from said contact material, separating out from the product the hydrogen sulfide formed by the dehydrogenation reaction, burning the hydrogen sulfide with an oxygen-containing gas in proportions sufficient to effect a release of heat with the production of hot sulfur dioxide-containing combustion gases, and contacting the contact material cyclically with the hot combustion gases to reheat the contact material.

2. The process of dehydrogenation of saturated lower hydrocarbons with sulfur dioxide which comprises: contacting a hot contact material at a pressure not less than atmospheric with a mixture of sulfur dioxide and saturated lower hydrocarbons until the temperature of the contact material drops below reaction temperature, withdrawing the reaction products from the contact material and quenching the products in a quench zone, so as to prevent further reaction of the material, separating hydrogen sulfide from the quenched products, burning the hydrogen sulfide with an oxygen-containing gas in proportions sufficient to release heat with the production of hot sulfur dioxide-containing combustion gases, and contacting the contact material cyclically with the hot combustion gases to reheat the cooled contact material up to reaction temperature.

3. The process of dehydrogenation of saturated lower hydrocarbons with sulfur dioxide which comprises: contacting a hot contact material at a pressure not less than atmospheric with a mixture of sulfur dioxide and saturated lower hydrocarbons for a period of time sufficient to effect dehydrogenation of the hydrocarbons, whereby the contact material is cooled by the reaction, withdrawing the products from said contact material, separating the hydrogen sulfide formed by the reaction from the remaining products, burning the hydrogen sulfide with an oxygen-containing gas in proportions sufficient to effect a release of heat, with the production of hot sulfur dioxide-containing combustion gases, contacting the contact material cyclically with the hot combustion gases to reheat the contact material, separating sulfur dioxide from the combustion gases, and charging the sulfur dioxide with the reactants, thereby providing at least a substantial portion of the sulfur dioxide required for the dehydrogenation reaction.

4. An improved method of dehydrogenating saturated lower hydrocarbons with sulfur dioxide over a heat carrying contact mass which supplies at least the heat of reaction comprising: gravitating a substantially compact mass of hot contact material downwardly through reaction and heating zones in an enclosed cyclic path; introducing at a pressure not less than atmospheric pressure a mixture of saturated lower hydrocarbons and sulfur dioxide into the mass in the reaction zone, in suitable proportions for effecting a dehydrogenation of the saturated hydrocarbons to unsaturated hydrocarbons and for producing hydrogen sulfide gas, withdrawing the products from the mass of solids in said reaction zone to a quench zone, where the temperature of the gases is reduced below reaction temperature, separating hydrogen sulfide from the remaining gases, burning the hydrogen sulfide with an oxygen-containing gas in proportions sufficient to produce hot sulfur dioxide-containing combustion gases, and passing these gases through the mass of solids in said heating zone, to supply the solids with at least a portion of the heat required in the reaction zone.

5. An improved method of dehydrogenating saturated lower hydrocarbons with sulfur dioxide over a heat carrying contact mass which supplies at least the heat of reaction comprising: gravitating a substantially compact mass of hot contact material downwardly through reaction, quench and heating zones in an enclosed cyclic path, introducing at a pressure not less than atmospheric pressure a mixture of saturated lower hydrocarbons and sulfur dioxide into the reaction zone, in suitable proportions for effecting the dehydrogenation of the saturated hydrocarbons to unsaturated hydrocarbons and for producing hydrogen sulfide gas, withdrawing the products from the reaction zone and passing the material through the mass of solids in the quench zone, so as to reduce the temperature of the products below the reaction temperature, separating hydrogen sulfide from the quenched products, burning the hydrogen sulfide with an oxygen-containing gas in proportions sufficient to produce hot sulfur dioxide-containing combustion gas and passing at least a portion of the hot combustion gas through the column of solids in the heating zone, so as to raise the temperature of the contact material, thereby supplying at least the heat of reaction to the solid material.

6. An improved method for converting ethane to ethylene with sulfur dioxide over a heat carrying contact mass which supplies at least the heat of reaction comprising: gravitating a substantially compact mass of hot contact material downwardly through reaction, quench and heating zones in an enclosed cyclic path, introducing at a pressure not less than atomspheric pressure a mixture of ethane and sulfur dioxide into the reaction zone, in suitable proportions for effecting the dehydrogenation of the ethane to ethylene and for producing hydrogen sulfide gas, withdrawing the converted products from the reaction zone and passing the material through the mass of solids in the quench zone, so as to reduce the temperature of the products below the reaction temperature, separating hydrogen sulfide from the products, burning the hydrogen sulfide with an oxygen-containing gas in proportions sufficient to produce hot sulfur dioxide-containing combustion gas, passing at least a portion of the hot combustion gas through the column of solids in the heating zone, so as to raise the temperature of the contact material, separating sulfur dioxide from the combustion gas and recycling the sulfur dioxide to the reaction zone, so as to provide at least a substantial portion of the required gas.

References Cited in the file of this patent
UNITED STATES PATENTS

| | | |
|---|---|---|
| 2,126,817 | Rosen | Aug. 16, 1938 |
| 2,168,150 | Baehr et al. | Aug. 1, 1939 |
| 2,423,418 | Stone et al. | July 1, 1947 |
| 2,508,993 | Crowley | May 23, 1950 |
| 2,548,286 | Bergstrom | Apr. 10, 1951 |